United States Patent [19]
Schleidt

[11] 3,785,852
[45] Jan. 15, 1974

[54] BITUMINOUS EMULSION-RUBBER LATEX COMPOSITIONS AND METHOD OF DEPOSITING COAGULA THEREFROM

[75] Inventor: George Wilhelm Schleidt, Shaker Heights, Ohio

[73] Assignee: The Tremco Manufacturing Company, Cleveland, Ohio

[22] Filed: May 10, 1972

[21] Appl. No.: 252,055

[52] U.S. Cl................ 117/105.5, 106/277, 106/279, 252/311.5, 260/28.5 AS
[51] Int. Cl............................ B05b 7/08, B44d 1/08
[58] Field of Search............... 106/277–281; 260/28, 28.5; 117/105.5; 252/311.5

[56] References Cited
UNITED STATES PATENTS
3,511,676  3/1970  Conn et al. ..................... 106/277 X
3,676,198  7/1972  McGroarty ..................... 106/277 X FOREIGN PATENTS OR APPLICATIONS
1,167,265  3/1967  Great Britain .................. 117/105.5

*Primary Examiner*—Joseph L. Schofer
*Assistant Examiner*—J. B. Evans
*Attorney*—Yount, Tarolli, Weinshenker & Cooper

[57] ABSTRACT

Method of depositing a coagulum from a bituminous emulsion-rubber latex composition by simultaneously spraying the composition and a coagulant under liquid pressure, along spray paths which converge so that the composition and coagulant mix thoroughly before contacting the surface being treated.

The use of polyvinyl alcohol as a stabilizer for the bituminous emulsion is also disclosed.

8 Claims, 1 Drawing Figure

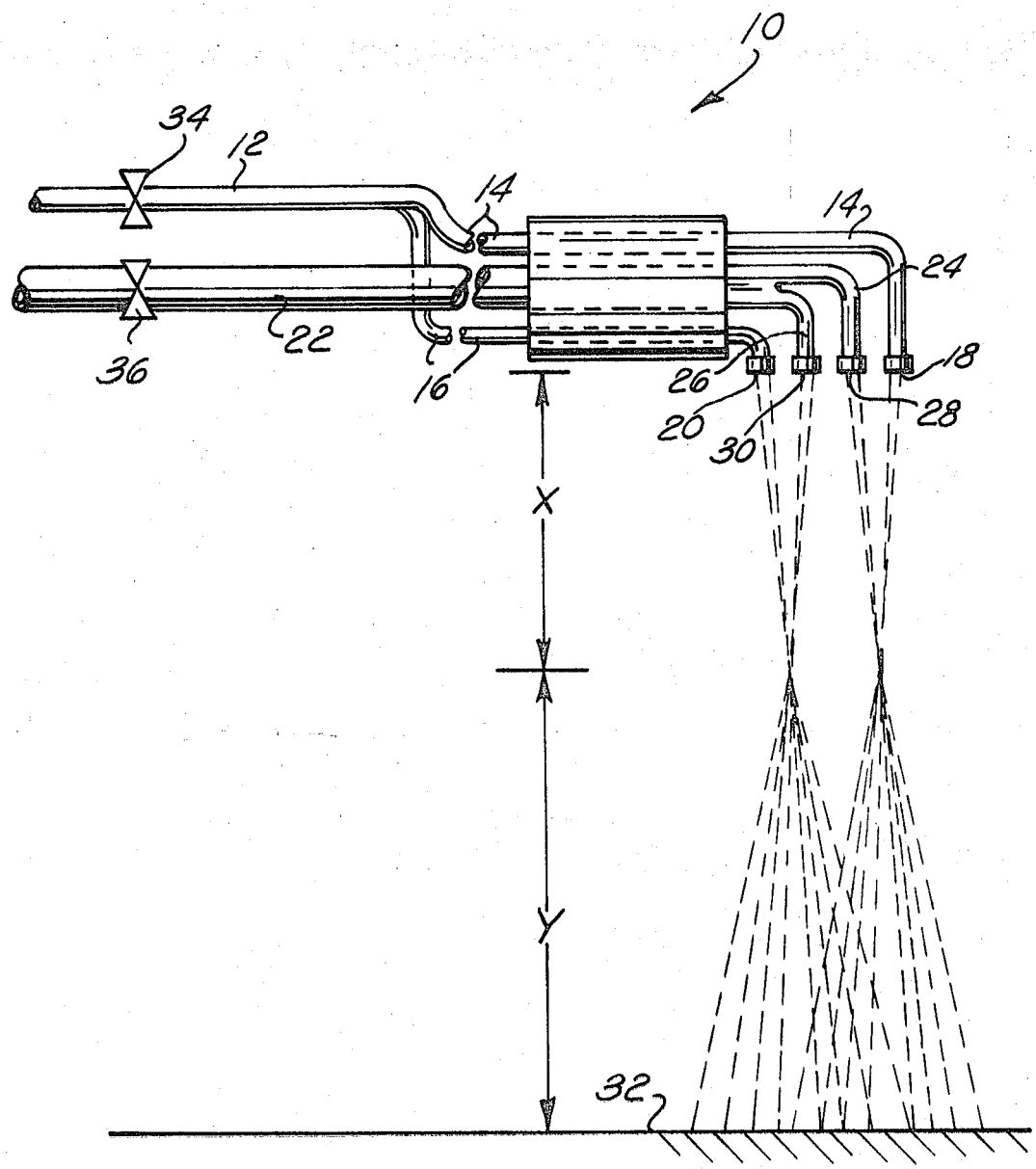

BITUMINOUS EMULSION-RUBBER LATEX COMPOSITIONS AND METHOD OF DEPOSITING COAGULA THEREFROM

This invention relates to improvements in bituminous emulsion-rubber latex compositions, a method of depositing coagula therefrom, and the resulting coagulated products.

The invention finds particular utility in roofing applications and will be described in reference thereto; however it will be appreciated that the invention has other uses, for example sound insulating, vibration dampening and vehicle undercoating.

For purposes of this disclosure the term "bituminous" is intended as a generic expression, embracing naturally occuring asphalt, petroleum derived asphalt, as well as coal derived bitumens, e.g., tars and pitches, shale oil residues and mixtures of the foregoing.

Heretofore bituminous emulsion-rubber latex compositions have been formulated by admixing a bituminous emulsion with a latex or other suspension of natural or synthetic rubber particles. The resulting compositions have been used for various purposes including insulation of refrigerating appliances (Modern Refrigeration, Volume 59 (1956) at page 38); paving (U.S. Pat. Nos. 2,670,332 and 2,509,777); and as adhesives (U.S. Pat. Nos. 2,537,190 and 2,506,339). These compositions have been applied by troweling, with a brush, or by spraying.

In all cases, curing was accomplished merely by drying, with the resulting loss of water producing a breaking of the bituminous emulsion and a coagulation of the rubber latex ingredient.

This type of composition has generally been found to be unsatisfactory in roofing and other applications where the combinations of relatively high temperatures and entrapped moisture have a deleterious effect on the physical integrity of the coating. Entrapped water results from the fact that the bituminous emulsion breaks faster than the rubber latex when the coating is permitted to set in air by water evaporation. As a consequence, the coating skims over with a membrane of bituminous material, entrapping water contained in the still emulsified rubber between the membrane and a surface.

It has also been proposed to simultaneously spray by gas atomization a bituminous emulsion alone or in admixture with a rubber latex, and a coagulant in such a way that the emulsion mixes with the coagulant at the moment when the emulsion contacts the surface. See British Patent 941,656.

This procedure does not overcome the above-described difficulties inasmuch as the coagulum it produces lacks a satisfactory level of homogeneity and contains weak spots. These defects are attributed to localized areas being coagulated by air drying rather than by chemical action. The air dried spots are weaker since the coagulated membrane consists essentially of bituminous material, and not a matrix of bituminous and rubbery materials. The rubber latex remains as a trapped uncoagulated pool beneath the surface of the coagulated bituminous membrane, to later swell and possibly rupture the membrane, as the water in the pool expands upon exposure to extreme temperatures.

Two steps in the practice of the process described in the British patent are believed to contribute to the formation of weak spots. The first is the step of contacting the bituminous composition with the coagulant at the moment when the composition contacts the surface and forms a continuous coating. This would appear to allow insufficient time for complete mixing of the bituminous composition and the coagulant. The second is the step of gas atomization which may tend to promote coagulation by drying, particularly in spots where the chemical coagulant must penetrate by migration rather than by direct contact due to the short interval when mixing takes place.

These and other shortcomings of the prior art practices have been overcome, in accordance with the present invention, by ensuring that both the bituminous emulsion and the rubber latex are chemically broken before the material strikes the surface. This is accomplished in part by directing separate streams of chemical coagulant and bituminous emulsion-rubber latex composition along paths which intersect each other at a sufficient distance from the surface to permit thorough comingling of the emulsion-latex composition with the coagulant, in advance of contact of the atomized streams with the surface. In this manner both the bituminous emulsion and the rubber latex are substantially broken by chemical action of the coagulant, before the materials contact the surface.

The advantages of the present invention are in further part achieved by generating the atomized streams of coagulant and emulsion-latex composition with liquid pressure rather than with gas atomization. In other words, an "airless" system is preferred. The use of such a system, coupled with the procedure for causing the streams of coagulant and emulsion-latex to thoroughly comingle before impinging upon the surface, results in better mixing of the ingredients, more uniform coagulation, and a more homogeneous coagulated film.

In accordance with another aspect of the present invention it has been found that coagula having improved low temperature characteristics can be deposited from compositions containing relatively stable bituminous emulsions, i.e., stable up to 6 months.

Heretofore it had been found that relatively stable bituminous emulsions, which required higher concentrations of conventional chemical coagulants, for example calcium chloride, performed poorly at low temperatures. This was believed due to the fact that the chemical coagulant, being hygroscopic, absorbed sufficient moisture to cause cracking in the material when the moisture expanded on freezing at low temperatures.

Good low temperature performance was obtainable only with relatively unstable bituminous emulsions, but these materials suffered from other disadvantages, such as short shelf life, and nonhomogeneous coagula caused by the use of prematurely coagulated bituminous emulsions.

In accordance with the present invention it has been found that the incorporation of a minor amount of polyvinyl alcohol in a relatively unstable, e.g., RS1 or RS2 bituminous emulsion will provide a stability of up to six months shelf life. However the concentration of the chemical coagulant, for example calcium chloride, required to break this stabilized emulsion has been found to be no greater than that required to break the relatively unstable RS1 or RS2 emulsion not containing polyvinyl alcohol. Thus, the incorporation of polyvinyl alcohol achieves satisfactory shelf life without requiring higher concentrations of chemical coagulant with its attendant problem of low temperature deterioration.

It is therefore an object of the invention to provide an improved method of depositing coagula from a bituminous emulsion-rubber latex composition.

A further object of the invention is to provide coagulated bituminous-rubber compositions having greater homogeneity than heretofore achieved by coagulating bituminous emulsion-rubber latex compositions.

Another object of the invention is to provide stabilized bituminous emulsion-rubber latex composition which has a longer shelf life than its unstabilized counterpart but requires no more coagulant to break than the corresponding unstabilized composition.

These and other objects and advantages of the invention will become apparent from the following detailed description, taken in conjunction with the accompanying drawing which is a schematic pictorial illustration of spraying apparatus being used to perform the method of the invention.

Referring to the drawing, there is illustrated spray apparatus designated generally as 10, comprising first pipe manifold 12 which splits into feed tubes 14, 16 terminating, respectively, in spray nozzles 18, 20.

The apparatus further comprises second pipe manifold 22 which splits into feed tubes 24, 26, terminating, respectively, in spray nozzles 28, 30.

Pipe manifolds 12, 22 are provided respectively with flow control valves 34, 36. Down stream of the valves, as will be readily appreciated though not illustrated, are storage facilities for the materials to be sprayed and liquid pressure generating means, e.g., pumps, interconnecting the storage facilities with pipe manifolds 12, 22.

It will be seen from the drawing that spray nozzles 18, 28 and 20, 30 are disposed in pairs and are canted slightly toward their paired mate so that the atomized streams of material extend along converging paths which intersect each other at a distance x from the point of generation of the streams.

In accordance with the preferred practice of the invention the bituminous emulsion-rubber latex composition is fed through pipe manifold 22, feed tubes 24, 26 and spray nozzles 28, 30, while the chemical coagulant is fed through pipe manifold 12, feed tubes 14, 16 and spray nozzles 18, 20. In this manner the coating composition, issuing from nozzles 28, 30 is enveloped in a "cone" of coagulant, tending to ensure maximum comingling of the two streams.

Though not necessarily producing equivalent results, the invention also contemplates a reversal of materials fed through the two pipe manifolds, as well as other arrangements of spray nozzles.

As also clearly illustrated in the drawing the streams issuing from spray nozzles 20, 30 and 18, 28 intersect at a distance y from surface 32. It is important in the practice of the invention that the distance represented by y be sufficient to permit thorough comingling of the bituminous emulsion-rubber latex streams in advance of contact of the atomized streamss with surface 32. To ensure thorough comingling of the streams, the distance y should be at least slightly greater than the distance x. In terms of practical dimensions, with spray nozzles held a distance of 12–24 inches from surface 32, the distance x is preferably within the range of 3–4 inches and y, preferably within the range of about 9–21 inches.

As previously stated the streams of bituminous emulsion-rubber latex and coagulant are generated by liquid pressure rather than gas atomization. The streams of liquids are pressurized by using gear pumps, centrifugal pumps or other means well known in the art. In addition to the previously mentioned advantages, liquid pressure atomization reduces overspray which can be important in roofing applications, particularly under windy conditions.

The principal ingredients of the coagulum-forming composition are a major proportion of a bituminous emulsion and a minor proportion of a material selected fromm the group consisting of natural and synthetic rubber latices and mixtures thereof.

A wide variety of bituminous materials may be employed as the emulsified ingredient of the composition. In general any bituminous material having a melting point in the range of about 85°F to about 160°F and a penetration of about 30 to about 200 can be used. Asphaltic materials are preferred but coal-derived tars and pitches, shale oil residues as well as compatible mixtures of the foregoing are also contemplated. Straight run materials as well as solvent cut backs having melting point and penetration inspections falling within the above ranges may be used.

Suitable emulsifying agents for forming oil-in-water emulsions of bituminous materials are well known to those skilled in the art. Representative examples include alkali soaps, resin soaps, rosin soaps, casein, proteins and the like.

Methods of emulsification are also well known in the art. The bituminous material may be heated to a temperature above its melting point, the emulsifying agent separately heated, and the two materials combined in a colloid mill or other mixing equipment.

A conventional stabilizing agent such as a caseinate, alginate, ammonium hydroxide, etc. may advantageously be added if the emulsion is to be stored for any significant period of time. For reasons mentioned above polyvinyl alcohol is a preferred stabilizer. In general satisfactory results are achieved by adding to the bituminous emulsion from about 1% to about 5% by weight of an aqueous solution containing from about 0.05% to about 0.25% by weight of polyvinyl alcohol.

Instead of preparing a bituminous emulsion ingredient any one of a number of commercially available emulsions may be used in the practice of the invention. One such is Emulsion RS-1 manufactured by Emulsified Asphalt Products of Chicago, Ill.

The rubber latex ingredient may be formed by emulsifying natural, or preferably one of a number of synthetic rubbers. Included in the latter group are butadiene styrene copolymers, polychloroprenes (neoprenes), butadiene acrylonitrile copolymers, organic polysulfides, etc. Polychloroprenes represent the preferred synthetic rubbers because of their excellent weathering properties and ready availability.

Suitable emulsifying agents for the rubber material include, in general, the same classes of materials described above as emulsifiers for the bituminous material. It is usually desirable to employ the same emulsifying agent for the bituminous and rubber materials to ensure compatibility and to reduce raw material costs.

It is also within the contemplation of the invention to employ commercially available rubber latices. Two of these are Neoprene 650 from DuPont and Baypren MKB58 (a polychlorobutadiene) from Farbenfabriken Bayer.

As the coagulant, any of a large number of water soluble salts and acids may be used. By way of examples only, calcium chloride, sodium chloride, hydrochloric acid and aluminum sulfate are satisfactory. Some consideration may have to be given to the corrosive effect of the coagulant on a particular surface. Thus where a ferrous metal surface is to be treated aluminum sulfate would be preferred over, for example, calcium chloride.

Suitable compositions of sprayable consistency will contain from about 98 to about 65 wt% of a bituminous emulsion containing from about 65 to about 75 wt% solids; and from about 2 to about 35 wt% rubber latex containing from about 55 to about 65 wt% solids. The admixture of emulsion and latex is conveniently made by adding the smaller quantity of latex to the larger quantity of emulsion with stirring until homogeneity is obtained.

A suitable coagulant can be prepared by forming from about a 3.5 to about a 5.0 wt% solution of calcium chloride in water. This solution would then be sprayed at the rate of from about one-fifth to about one-fourth gallons per gallon of bituminous emulsion-rubber latex composition. These rates need not be adjusted when a polyvinyl alcohol stabilizer is added to the bituminous emulsion because, as previously noted, this particular stabilizer does not increase the concentration of coagulant required to break the emulsion.

With the above described compositions fed by liquid pressure to the nozzles of spraying apparatus illustrated in the accompanying drawing, and with the nozzles maintained a distance of from about 1 to about 2 feet from the surface being treated, there is developed on the surface a coagulum exhibiting greater homogeneity, and virtually free weak spots, when compared with coagula deposited by prior art methods.

The foregoing invention has been described in conjunction with certain specific embodiments and examples. It will be appreciated, however, that various changes may be made in the illustrated embodiments and examples without departing from the scope and spirit of the invention.

I claim:

1. In a method of depositing on a surface a coagulum from a composition comprising (1) a major proportion of a bituminous emulsion, and (2) a minor proportion of a material selected from the group consisting of natural and synthetic rubber latices and mixtures thereof, by simultaneously spraying said composition and a coagulant therefrom the improvement which comprises generating by liquid pressure, along a first path, an atomized stream of said composition; generating by liquid pressure along a second path, intersecting said first path, an atomized stream of coagulant for said emulsion and said latex; directing said streams toward said surface; and maintaining the point of intersection of said paths a sufficient distance from said surface to permit thorough comingling of said composition and said coagulant in advance of contact of the atomized streams with said surface.

2. The method of claim 1 wherein said composition comprises from about 2 to about 35 wt% synthetic rubber latex.

3. The method of claim 2 wherein said synthetic rubber latex is a neoprene.

4. The method of claim 2 wherein said coagulant is an aqueous solution of a material selected from the group consisting of aluminum sulfate, hydrochloric acid, calcium chloride and sodium chloride.

5. The method of claim 3 wherein said coagulant is calcium chloride.

6. The method of claim 2 wherein said composition further comprises from about 1 to about 5 wt% of an aqueous solution, containing from about 0.05 to about 0.25 wt% polyvinyl alcohol.

7. In a method of depositing on a surface a coagulum from a composition comprising (1) a major proportion of a bituminous emulsion and (2) a minor proportion of a material selected from the group consisting of natural and synthetic rubber latices and mixtures thereof by simultaneously spraying said composition and a coagulant therefor, the improvement which comprises generating by liquid pressure, along a first path, an atomized stream of said composition; generating by liquid pressure along a second path, intersecting said first stream at a distance X from its point of generation, with an atomized stream of coagulant for said emulsion and said latex; directing said streams toward said surface; and maintaining the point of intersection of said paths a distance Y from said surface where Y is greater than X, whereby said composition and said coagulant mix thoroughly before contacting said surface.

8. A coagulum produced in accordance with the method of claim 1.

* * * * *